United States Patent [19]

Greenbaum

[11] Patent Number: 4,657,646
[45] Date of Patent: Apr. 14, 1987

[54] METHOD OF PRODUCING METALLIZED CHLOROPLASTS AND USE THEREOF IN THE PHOTOCHEMICAL PRODUCTION OF HYDROGEN AND OXYGEN

[75] Inventor: Elias Greenbaum, Oak Ridge, Tenn.

[73] Assignee: The United States of America as represented by the United States Department of Energy, Washington, D.C.

[21] Appl. No.: 802,097

[22] Filed: Nov. 25, 1985

[51] Int. Cl.$^4$ .............................................. B01J 19/12
[52] U.S. Cl. ............................ 204/157.5; 204/157.52; 204/902; 422/186; 427/212; 502/163; 502/167
[58] Field of Search ................ 204/157.5, 157.52, 902; 502/163, 167; 422/186; 427/180, 212

[56] References Cited

U.S. PATENT DOCUMENTS

| | | | |
|---|---|---|---|
| 4,072,630 | 2/1978 | Douglas | 502/163 |
| 4,382,846 | 5/1983 | Gratzel et al. | 204/157.5 |
| 4,394,293 | 7/1983 | Gratzel et al. | 502/159 |
| 4,595,568 | 6/1986 | Van Damme et al. | 422/186 |
| 4,606,798 | 8/1986 | Sasse et al. | 204/157.52 |

OTHER PUBLICATIONS

Adams et al, Photobiochemistry and Photobiophysics, vol. 1, (1979) pp. 33–41.
Cuendet et al, Photobiochemistry and Photobiophysics, vol. 5 (1983) pp. 335–345.
Fong et al, J.A.C.S., vol. 100, No. 11 (May 1978), pp. 3594–3596.
Bockris et al, Bioelectrochemistry (1980), pp. 19–29.

Primary Examiner—Howard S. Williams
Attorney, Agent, or Firm—Katherine P. Lovingood; Stephen D. Hamel; Judson R. Hightower

[57] ABSTRACT

The invention is primarily a metallized chloroplast composition for use in a photosynthetic reaction. A catalytic metal is precipitated on a chloroplast membrane at the location where a catalyzed reduction reaction occurs. This metallized chloroplast is stabilized by depositing it on a support medium such as fiber so that it can be easily handled. A possible application of this invention is the splitting of water to form hydrogen and oxygen that can be used as a renewable energy source.

16 Claims, 2 Drawing Figures

METHOD OF PRODUCING METALLIZED CHLOROPLASTS AND USE THEREOF IN THE PHOTOCHEMICAL PRODUCTION OF HYDROGEN AND OXYGEN

This invention was developed pursuant to a contract with the U.S. Department of Energy.

BACKGROUND OF THE INVENTION

This invention relates to metallized chloroplasts wherein catalytic metals are precipitated on chloroplast membranes. This composition is then deposited on a non-reacting solid support medium for use in the conversion of light energy to chemical energy by way of a photosynthetic reaction.

In general, photosynthetic reactions that occur in nature involve the conversion of solar energy into chemical energy by formation of complex carbohydrates from carbon dioxide and water in the presence of chloroplasts. Studies have been done on the possibility of using solar energy and chloroplasts to perform other reactions such as splitting of water to form gaseous hydrogen and oxygen. This has typically been done utilizing chloroplasts, a biocatalyst that permits an electron transfer reaction to evolve a product, and an electron relay that transports electrons from the chloroplast to the biocatalyst. Since these reactions have been done in aqueous suspension an electron relay was required. The biocatalysts have typically been naturally occurring biocatalysts such as hydrogenase, although inorganic catalysts have been proposed in order to develop a partially synthetic system. Inorganic catalysts, such as precious metals, subjected to procedures similar to those described for the natural biocatalysts have given unfavorable results because of the oxidation of the electron relay upon the evolution of oxygen. Therefore, it is necessary to develop a process to eliminate the oxidation of the electron relay so that the evolution of oxygen is not a problem.

SUMMARY OF THE INVENTION

In view of the above-described need, it is an object of this invention to provide a new composition of matter that will be used to convert light energy to stored chemical energy.

It is another object of this invention to develop a process for photosynthetically converting light energy to chemical energy without the requirement of having an electron relay transport medium.

Additional objects and advantages will become apparent to those skilled in the art upon examination of the specification and the claims. To achieve the foregoing and other objects, this invention is a composition of matter comprising catalytic colloidal metal contacting photosynthetic chloroplast membranes at locations of photosynthetic reduction. The invention is also a process of making the above-described composition of matter, herein referred to as metallized chloroplasts, comprising isolating chloroplasts, introducing a solution of a soluble compound of a metal catalyst to the isolated chloroplast, and precipitating the colloidal metal catalyst onto the surface of the chloroplast membranes by reducing the metal. It is also a structure wherein the above-mentioned composition of matter is deposited upon a nonreacting solid support medium. In addition to the above, the invention is also a photosynthetic reaction chamber comprising a chamber, metallized chloroplasts supported on a non-reacting solid support medium contained within the chamber, a source of light that is capable of being directed at the metallized chloroplasts, and an inlet into the chamber for introducing reactant and an outlet from the chamber for removing product. Also the invention is a process for converting light energy to stored chemical energy by directing light at metallized chloroplasts in the presence of reactants that undergo reaction resulting in stored chemical energy in the form of products of the reaction.

The advantage of the new composition of matter is that the metal catalyst is deposited directly on the chloroplast thereby eliminating the need for an electron relay to transport electrons from the chloroplast to the catalyst. A number of uses might be contemplated for the new composition of matter, the process for making it, the structure, the photosynthetic reaction chamber, and the process for converting light energy to stored chemical energy. One example is the splitting of water into hydrogen and oxygen gases which can then be used as synthetic fuel.

DETAILED DESCRIPTION OF THE PREFERRED EMBODIMENT

Photosynthesis is the biological process by which light energy is converted to stored chemical energy. As the process occurs in nature, the chemical energy is in the form of biomolecules such as carbohydrates, lipids, proteins and nucleic acids. The synthesis of these reduced carbon compounds requires light energy to be absorbed in the membranes of plant chloroplasts resulting in a flow of electric current from water, the electron source, to an electron acceptor. In this photo-process, oxygen is liberated from water and the reduced electron acceptor enters the Calvin cycle, the enzymatic biological pathway for carbon dioxide reduction. The absorption of the light energy in the chloroplast that results in electric current flow led to the consideration of systems that could drive photo-reactions other than carbon dioxide reduction. Since water is split during the photosynthetic reaction at the chloroplast into oxygen, electrons and protons, researchers have investigated photosynthetic reactions that will provide the reuniting of the protons and electrons to form hydrogen gas. Previously, these experiments have been done in aqueous suspension; therefore it was necessary to have an electron relay that could carry the electrons to the protons for recombination to form hydrogen gas. However, the electron relay tends to be readily oxidized by the oxygen that is evolved in the water splitting process of photosynthesis and introduces kinetic limitations resulting in limited electron transfer to the proton. A preferred method is to have the catalyst that facilitates the recombination of the electron and the hydrogen proton to be physically contacting the chloroplast where the emergence of the electron occurs so that electron transport through an aqueous medium is unnecessary.

This invention has accomplished the objective to overcome the problems of previous research. Colloidal metal is precipitated directly onto the photosynthetic membranes in an aqueous suspension. The resulting chloroplast-colloidal metal composition is then entrapped on filter paper. When placed in a photosynthetic reaction chamber and irradiated with light this moistened material is capable of sustained simultaneous photo-evolution of hydrogen and oxygen. Since no electron relay is added to the system and the overall reaction occurs in an immobilized matrix, it is concluded that the precipitated colloidal metal is in direct contact with the reducing end of the chloroplast in such a way that electron flow occurs across the biological membrane-metal colloid interface with preservation of charge continuity and catalytic activity.

Figure 2:
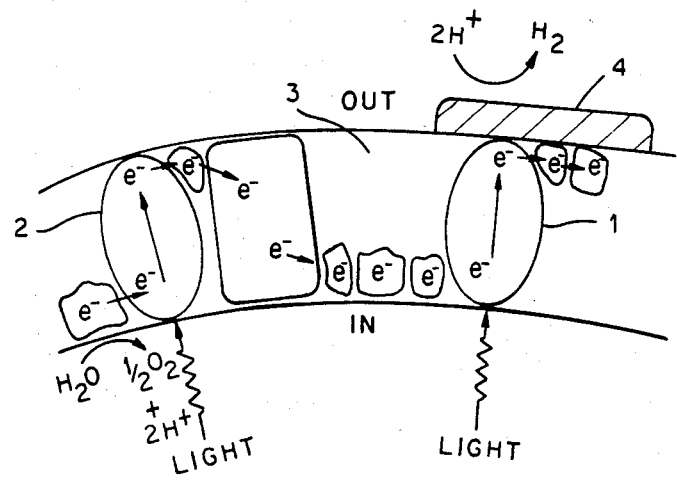
FIG. 2 schematically illustrates a photosynthetic membrane on which a catalytic metal has been precipitated in accordance with this invention.

The process is believed to occur as shown in FIG. 2 and can be explained in the following manner. Photosynthesis consists of two serial light reactions called Photosystem I 1 and Photosystem II 2 that are embedded in the photosynthetic membrane 3. The reduction site where electrons evolve is at Photosystem I on the photosynthetic membrane surface and derives its electrons from an electric current originating from water splitting occurring at Photosystem 11 according to the equation

$$H_2O \rightarrow \tfrac{1}{2}O_2 + 2H^+ + 2e^- \quad \text{(Equation I)}$$

When the catalytic metal is precipitated by reduction of the metal salt using the electrons emerging at Photosystem I, the metal 4 is precisely located where needed for the photosynthetic reaction to occur, at Photosystem I. The precipitated metal can then catalyze a reaction such as the formation of hydrogen according to the equation

$$2e^- + 2H^+ \rightarrow H_2 \quad \text{(Equation II)}$$

utilizing electrons originating at Photosystem 11 and emerging at Photosystem I.

In the preferred embodiment of this invention the metal catalyst is platinum. Isolated chloroplasts are prepared from green leaves of a higher plant, such as spinach, and suspended using a standard suspending medium and procedure known to those skilled in the art. The suspended chloroplasts are then added to a solution of a compound of a hydrogen evolving metal catalyst such as platinum, palladium, and rhodium. The metal is then reduced and precipitated as colloidal metal onto the chloroplast membranes to form metallized chloroplasts. The solution containing the metallized chloroplast is then filtered onto a filter sheet. The liquid passes through the filter and the metallized chloroplasts are retained on and entrapped within the filter thereby immobilizing the chloroplasts on the inert solid support of the filter thus providing a structure that is a photocatalytic composite uniquely applicable for use in a photoreaction chamber. The preferred method for precipitating platinum onto the chloroplast is to utilize radiant energy that affects an electron current flow from Photosystem II, the electrons thus becoming reducing equivalents for platinum resulting in the platinum being precipitated at the Photosystem I location where it is needed. This results in an economic use of platinum since the platinum is not dispersed over the entire area of the chloroplast. Another method for precipitating platinum is to continuously purge the chloroplast-metal compound solution with hydrogen while continuously stirring at room temperature until the metal is reduced and colloidal metal is precipitated on the surface of the chloroplast. In this method hydrogen is the source for reducing equivalents for platinum.

To use the stabilized metallized chloroplasts they are placed in a reaction cell of a photoreactor that is then hermetically sealed. An inert carrier gas is humidified and permitted to enter the photoreactor and come in contact with the metallized chloroplasts which remain moist. Desiccation of the metallized chloroplast is thus prevented by the use of humidified carrier gas, which also serves as a source of water for the water-splitting reaction in addition to the water already retained on the surface of the metallized chloroplast. When the photoreactor is in place, thus, the reaction cell is illuminated with a light that can be from any visible portion of the solar emission spectrum, including wavelengths from 400 to 700 nm region. Under these conditions hydrogen and oxygen are produced in the reactor and swept out by the carrier gas. The resulting hydrogen and oxygen can be used in combination with as a fuel source or can be separated for other uses.

EXAMPLE

Approximately 20 grams of de-ribbed spinach leaves were ground in a blender with 300 milliliters cold grinding medium that was at 0° to 5° C. The grinding medium had the composition as shown in Table I.

TABLE I

| Grinding medium for isolating chloroplasts |
|---|
| 0.33 M sorbitol |
| 10 mM Na$_2$P$_2$O$_7$ |
| 4 mM MgCl$_2$ |
| 2 mM ascorbic acid |
| pH = 6.5 |

The leaves and grinding medium were ground in a blender using 3 bursts of 5 seconds duration each. The mixture was filtered through two layers of cheese cloth and then a second time through eight layers of cheese cloth. The filtrate was then centrifuged in a laboratory bench-top centrifuge for a few minutes. The supernatant liquid was discarded and the chloroplast pellet was resuspended with the resuspending medium described in Table II.

TABLE II

| Medium for resuspending chloroplasts |
|---|
| 0.33 M sorbitol |
| 2 mM EDTA |
| 1 mM MgCl$_2$ |
| 1 mM MnCl$_2$ |
| 50 mM HEPES |
| pH = 7.6 |

The resuspended chloroplasts were centrifuged again and resuspended in a diluted resuspending medium containing 0.05 M sorbitol instead of the 0.33 M sorbitol of Table II. The final volume of chloroplast was 40 ml of which 5 ml was used for the next step of the preparation.

A solution of chloroplatinic acid (H$_2$PtCl$_6$.6H$_2$O) of concentration of 5 milligrams per milliliter was prepared in distilled water and neutralized to pH 7 with 1 N sodium hydroxide. One milliliter of this solution was combined with 5 milliliters of the chloroplast suspension and placed in a completly enclosed reactor having an inlet and outlet port. A stirrer was included in the reactor to stir the chloroplast platinum mixture at room temperature as hydrogen gas purged the reactor by means of the inlet and outlet ports. It is well known that catalytic colloidal platinum can be precipitated from a solution of platinum salts with a wide variety of reducing agents including molecular hydrogen.

Figure 1:
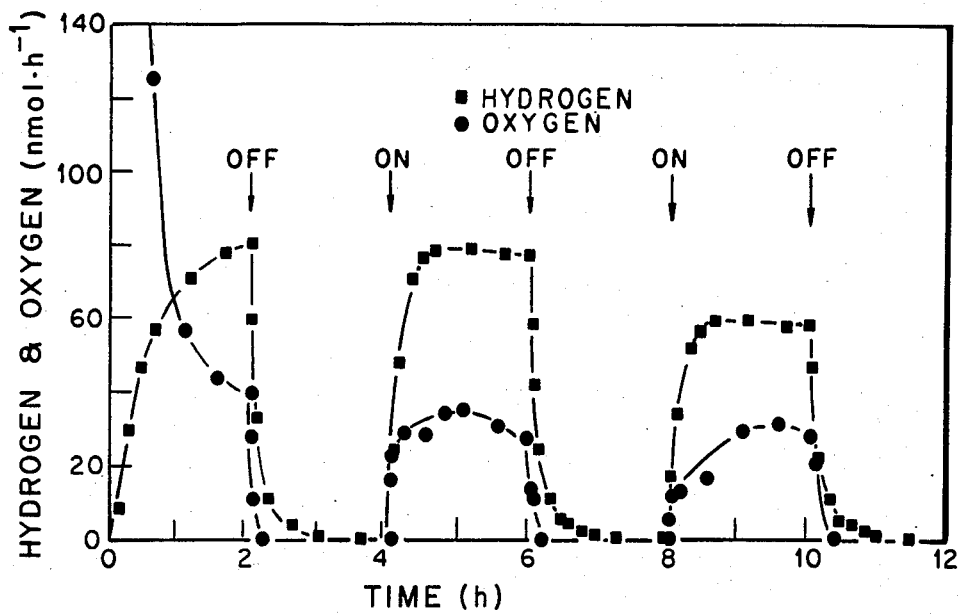
FIG. 1 graphically illustrates the amount of hydrogen and oxygen evolved using the invention described in this application.

After precipitation, the chloroplast-platinum mixture was placed in a filtration apparatus and filtered onto fiberglass filter paper. After filtration the entrapped chloroplast-platinum composition of matter is ready to be used. The reaction chamber containing the composition of matter was used as described above to split water into molecular hydrogen and oxygen. The light source was turned on for two-hour intervals and the amounts of hydrogen and oxygen evolved are graphically illustrated in FIG. 1. Although the example illustrates a method of reducing the catalytic colloidal platinum with hydrogen, a preferred method is to use the chloroplast and light energy instead of hydrogen, thereby producing electron flow at Photosystem I. These electrons can be used as the reducing equivalents for precipitating elemental platinum from solution instead of molecular hydrogen which is the chemical reductant described in the example. This method has the advantage of being site specific thereby precipitating catalytic platinum at the location where it is needed, at Photosystem I.

Although the above example describes a method for precipitating platinum onto photosynthetic membranes for splitting water into molecular hydrogen and oxygen, other variations to this basic idea are possible. For instance, in the production of $NH_3$ from $N_2$ in nature, the biocatalyst is nitrogenase which contains iron and molybdenum. Therefore, if it were possible to complex iron and molybdenum and precipitate it onto a chloroplast, this catalyst may be appropriate for producing $NH_3$ using protons and electrons from water in combination with nitrogen to form ammonia in a similar reaction as described above. Other metals could be precipitated onto photosynthetic membranes each with its own optimum catalytic activity. For example, rhodium could be precipitated onto the chloroplast and carbon dioxide could be used as a carrier gas to photoproduce either carbon monoxide or methane or both.

Isolating the metal catalyst and depositing it directly on the chloroplast is a significant improvement in the development of photochemical reaction cells since it is not necessary to operate the system in an aqueous solution nor is it necessary to have an electron relay in order to transfer the electrons from the chloroplast to the catalyst. Another advantage is that the system can operate using any commonly available light source with no external energy required. It is conceivable that this invention is the basis for future development of commercial production of hydrogen and oxygen and will be very useful in the development of renewable fuels and chemical feedstock production.

I claim:

1. A composition of matter comprising catalytic colloidal metal chemically bound to photosynthetic chloroplast membranes at locations of photosynthetic reduction capable of evolving hydrogen and oxygen from water by photosynthetic reduction without the use of an electron carrier.

2. The composition of matter of claim 1 wherein said colloidal metal is selected from the group iron, molybdenum, rhodium, palladium and platinum.

3. The composition of matter of claim 1 wherein said colloidal metal is platinum.

4. A process for making the composition of matter of claim 1 comprising:
   isolating chloroplasts;
   introducing a solution of a soluble compound of a metal catalyst to said isolated chloroplasts; and
   chemically binding a colloidal metal catalyst from said soluble compound onto the surface of said isolated chloroplasts at locations of photosynthetic reduction by reducing said metal resulting in metallized chloroplasts.

5. The process of claim 4 wherein said colloidal metal catalyst is selected from the group iron, molybdenum, rhodium, palladium and platinum.

6. The process of claim 4 wherein said colloidal metal catalyst is platinum.

7. The process of claim 6 wherein said soluble metal compound is chloroplatinic acid.

8. A structure suitable for facilitating a photoreaction comprising said composition of matter of claim 1 deposited on a nonreacting solid support medium.

9. The structure of claim 8 wherein said colloidal metal is selected from the group iron, molybdenum, rhodium, palladium and platinum.

10. The structure of claim 8 wherein said colloidal metal is platinum.

11. A photoreaction chamber comprising:
    an enclosed chamber;
    a nonreacting solid support medium contained within said enclosed chamber; and
    metallized chloroplasts comprising catalytic colloidal metal contacting chemically bound to a photosynthetic chloroplast membrane at locations of photosynthetic reduction supported by said nonreacting solid support medium;
    a light source including wavelengths from 400 to 700 nm that can be directed at said metallized chloroplasts;
    an inlet into said chamber for introducing reactant; and
    an outlet from said chamber for removing products.

12. The photoreaction chamber of claim 11 wherein said catalytic colloidal metal is selected from the group iron, molybdenum, rhodium, palladium and platinum.

13. The photoreaction chamber of claim 11 wherein said catalytic colloidal metal is platinum, said reactant is water and said products are gaseous hydrogen and gaseous oxygen.

14. A process for converting light energy to stored chemical energy comprising:
    (a) preparing metallized chloroplasts by isolating chloroplasts, introducing a solution of a soluble compound of a metal catalyst to said isolated chloroplasts, chemically binding a colloidal metal catalyst from said soluble compound onto the surface of said isolated chloroplasts at locations of photosynthetic reduction by reducing said metal resulting in metallized chloroplasts;
    (b) depositing said metallized chloroplasts on a nonreacting solid support medium;
    (c) placing said metallized chloroplasts and said solid support medium within an enclosed chamber having an inlet for introducing reactant and an outlet for removing products;
    (d) directing light including wavelengths from 400 to 700 nm onto said metallized chloroplasts;
    (e) introducing into said chamber a reactant capable of undergoing a reaction in the presence of said light and said metallized chloroplast to produce stored chemical energy in the form of a product or products of said reaction; and (f) removing said product or products from said chamber.

15. The process of claim 14 wherein said colloidal metal catalyst is selected from the group iron, molybdenum, rhodium, palladium and platinum.

16. The process of claim 14 wherein said colloidal metal catalyst is platinum, said reactant is water and said products are gaseous hydrogen and gaseous oxygen.

* * * * *